(12) United States Patent
Kim

(10) Patent No.: US 12,722,478 B2
(45) Date of Patent: Sep. 1, 2026

(54) AGRICULTURAL TRACTOR

(71) Applicant: LS MTRON LTD., Anyang-si (KR)

(72) Inventor: Jiwon Kim, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 0 days.

(21) Appl. No.: 19/299,523

(22) Filed: Aug. 14, 2025

(65) Prior Publication Data

US 2025/0368031 A1 Dec. 4, 2025

Related U.S. Application Data

(63) Continuation of application No. PCT/KR2024/001082, filed on Jan. 23, 2024.

(30) Foreign Application Priority Data

Mar. 22, 2023 (KR) ........................ 10-2023-0037212

(51) Int. Cl.

*B60K 15/063* (2006.01)
*B60K 15/04* (2006.01)
*B60K 15/073* (2006.01)
*B60S 1/50* (2006.01)

(52) U.S. Cl.

CPC ............ *B60K 15/063* (2013.01); *B60K 15/04* (2013.01); *B60K 15/073* (2013.01); *B60S 1/50* (2013.01); *B60K 2015/0638* (2013.01); *B60Y 2200/221* (2013.01)

(58) Field of Classification Search

CPC .... B60K 15/063; B60K 15/04; B60K 15/073; B60K 2015/0638; B60S 1/50; B60Y 2200/221

See application file for complete search history.

(56) References Cited

U.S. PATENT DOCUMENTS

2017/0190247 A1* 7/2017 Sharkar .................. A01D 34/82

FOREIGN PATENT DOCUMENTS

| | | | | |
|---|---|---|---|---|
| CN | 101134475 B | * 7/2012 | ........... B60K 15/067 |
| JP | 2006199056 A | 8/2006 | |
| JP | 2016088389 A | 5/2016 | |
| KR | 20150145034 A | 12/2015 | |
| KR | 20160063810 A | * 6/2016 | ............. B62D 33/06 |
| KR | 20190135560 A | 12/2019 | |
| WO | 2008037175 A1 | 4/2008 | |
| WO | WO-2015199182 A1 | * 12/2015 | ............. B60R 13/08 |

(Continued)

OTHER PUBLICATIONS

CN-101134475-B Machine English Translation (Year: 2012).*

(Continued)

*Primary Examiner* — Jason D Shanske
*Assistant Examiner* — Matthew James O'Neill
(74) *Attorney, Agent, or Firm* — K&L Gates LLP

(57) ABSTRACT

The present disclosure relates to an agricultural tractor. In an agricultural tractor according to the present disclosure, a first injection hole for injecting fuel is arranged on a first fender side, and a second injection hole for injecting cleaning fluid is arranged on a second fender side. According to the present disclosure, effects are achieved in that a design with the aesthetics of a symmetrical balance is enabled and the center of gravity can be stably maintained.

13 Claims, 8 Drawing Sheets

(56) References Cited

FOREIGN PATENT DOCUMENTS

WO WO-2017069239 A1 * 4/2017 ............... F01N 3/08

OTHER PUBLICATIONS

KR-20160063810-A Machine English Translation (Year: 2016).*
WO-2017069239-A1 Machine English Translation (Year: 2017).*
WO-2015199182-A1 Machine English Translation (Year: 2015).*
International Search Report for related International Application No. PCT/KR2024/001082; action dated Sep. 26, 2024; (2 pages).
Written Opinion for related International Application No. PCT/KR2024/001082; action dated Sep. 26, 2024; (4 pages).

* cited by examiner

AGRICULTURAL TRACTOR

CROSS-REFERENCE TO RELATED APPLICATION

This application is a Continuation Application of International Application No. PCT/KR2024/001082 filed on Jan. 23, 2024, which claims priority to and the benefit of Korean Patent Application No. 10-2023-0037212, filed Mar. 22, 2023, the disclosures of which are incorporated herein by reference in its entirety.

FIELD

The present disclosure relates to a tractor, which is a work vehicle used in agricultural work, and more particularly to the arrangement structure of a fuel tank and a cleaning fluid tank.

BACKGROUND

Agricultural tractors are work vehicles that perform necessary agricultural work while attaching and detaching multiple auxiliary implements thereto and therefrom.

Agricultural tractors are mainly equipped with diesel engines.

Accordingly, agricultural tractors need to be equipped with separate fuel tanks for storing fuel.

Meanwhile, agricultural tractors have cabins that isolate a boarding room from an external environment so that a driver can perform work in a comfortable environment.

Such a cabin is equipped with windows to ensure forward and rearward fields of view for the driver in the boarding room. It is also equipped with window brushes for wiping the windows.

Agricultural tractors are work vehicles, so that window surfaces are easily contaminated by dust and foreign materials generated during work processes. When the window surfaces are contaminated, a driver's field of view is naturally obscured, and thus contaminants act as obstacles that interfere with the driver's appropriate performance of work. Therefore, an implementation is made to operate window brushes while spraying cleaning fluid onto window surfaces.

By spraying cleaning fluid while wiping the window surfaces with the window brushes, foreign materials may be easily and rapidly removed from the window surfaces.

It is obvious that agricultural tractors need to be equipped with cleaning fluid tanks capable of storing cleaning fluid and the cleaning fluid to be used needs to be pre-filled and stored in the tanks.

In general, the fuel tanks and the cleaning fluid tanks may be shaped freely. The reason for this is that the fuel tanks and the cleaning fluid tanks are filled with liquid substances that can change their shapes freely, so that the shapes thereof are irrelevant as long as the internal capacities thereof are secured.

Therefore, the fuel tank and the cleaning fluid tank are arranged in such a manner as to make the most of any excess space in the arrangement design of other basic components of the agricultural tractors. This leads to the following problems:

First, the overall design of such an agricultural tractor is not symmetrical, resulting in a lack of the aesthetics of a balance in terms of appearance.

Second, in the case of a fuel tank, fuel is repeatedly filled therein and emptied therefrom. In this case, when the fuel tank is off-centered to one side, the weight balance of the agricultural tractor becomes unstable depending on the amount of fuel stored. This is likely to result in rollover accidents of the agricultural tractor.

Third, it may be difficult to position an injection hole in the space where a fuel tank or cleaning fluid tank will be installed. Generally, it is most preferable to arrange the injection hole at a location where an operator can inject fuel or fluid appropriately with minimal effort. In other words, it is difficult when the injection hole is positioned to be excessively high or excessively low. Accordingly, in some cases, it may be necessary to extend an injection hole side in a pipe form to obtain an appropriate location and height. In this case, the asymmetry of the fuel or cleaning fluid tank becomes even greater, and the assembly thereof becomes more difficult. Furthermore, finding an injection hole, which is positioned at an awkward location, is not intuitive, so that this can make filling the fuel and cleaning fluid tanks with fuel or cleaning fluid somewhat cumbersome. It is obvious that, when the operator of the agricultural tractor fills the tanks himself, injection holes can be easily found. However, when someone other than the operator attempts to fill the tanks, it is somewhat cumbersome to fill the tanks with fuel or fluid because filling locations vary depending on the type of agricultural tractor.

RELATED ART LITERATURE

Patent Literature (Patent document 1) Korean Patent Application Publication No. 10-2015-0145034

(Patent document 2) Korean Patent Application Publication No. 10-2016-0063810

SUMMARY

The present disclosure has been conceived from the following motives:

First, the structure and arrangement of a fuel tank and a cleaning fluid tank need to have the aesthetics of a balance in terms of appearance.

Second, the structure and arrangement of the fuel tank and the cleaning fluid tank need to be designed to appropriately maintain the center of gravity of an agricultural tractor.

Third, the location at which fuel or cleaning fluid is injected needs to be intuitive and be placed at an appropriate height.

According to an aspect of the present disclosure, there is provided an agricultural tractor including: an engine configured to generate power; a fuel tank configured to store fuel required for the engine to generate the power, and provided with a first injection hole for injecting the fuel to be stored; a first opening/closing cover configured to selectively open and close the first injection hole; a first rear wheel configured to be rotated by the power of the engine; a second rear wheel spaced apart from the first rear wheel in a left-right direction, and configured to be rotated by the power of the engine; a first fender configured to surround a portion above the first rear wheel; a second fender configured to surround a portion above the second rear wheel; a transmission configured to shift the power of the engine and transmit the shifted power to the first and second rear wheels; a cabin provided above the transmission, and configured to form a boarding room in which a driver boards; a window brush configured to wipe a window in the cabin; a cleaning fluid tank configured to store cleaning fluid that can be sprayed onto a window surface to be wiped by the window brush, and provided with a second injection hole for injecting the cleaning fluid to be stored; and a second opening/closing cover configured to selectively open and close the second injection hole; wherein the first fender has a first exposure hole capable of exposing the first opening/closing cover at a location corresponding to the first injection hole.

The second fender has a second exposure hole capable of exposing the second opening/closing cover at a location corresponding to the second injection hole.

The first and second exposure holes are formed at corresponding locations on left and right sides.

The fuel tank is positioned in an area behind the cabin, and one side of the fuel tank hangs over the first fender and a remaining side of the fuel tank hangs over the second fender when viewed forward from the rear; and the cleaning fluid tank is arranged adjacent to the remaining side of the fuel tank.

Turn signals may be arranged at a rear of one side of the fuel tank and a rear of the cleaning fluid tank, respectively.

The fuel tank and the cleaning fluid tank may be provided in an integrated form, and may be separated from each other by a partition wall.

According to another aspect of the present disclosure, there is provided an agricultural tractor including: an engine configured to generate power; a fuel tank configured to store fuel required for the engine to generate the power, and provided with a first injection hole for injecting the fuel to be stored; a first opening/closing cover configured to selectively open and close the first injection hole; a first rear wheel configured to be rotated by the power of the engine; a second rear wheel spaced apart from the first rear wheel in a left-right direction, and configured to be rotated by the power of the engine; a transmission configured to shift the power of the engine and transmit the shifted power to the first and second rear wheels; a cabin provided above the transmission, and configured to form a boarding room in which a driver boards; a window brush configured to wipe a window in the cabin; a cleaning fluid tank configured to store cleaning fluid that can be sprayed onto a window surface to be wiped by the window brush, and provided with a second injection hole for injecting the cleaning fluid to be stored; and a second opening/closing cover configured to selectively open and close the second injection hole; wherein the first and second opening/closing covers are arranged at corresponding locations on left and right sides.

The fuel tank is arranged in an area behind the cabin; and the cleaning fluid tank is arranged adjacent to a remaining side of the fuel tank.

Turn signals are arranged at a rear of one side of the fuel tank and a rear of the cleaning fluid tank, respectively.

The fuel tank and the cleaning fluid tank are provided in an integrated form, and are separated from each other by a partition wall.

The present disclosure has the following effects:

First, the injection holes of the fuel tank and the cleaning fluid tank are provided in the fenders in a built-in manner, and the structure and arrangement of the fuel tank and the cleaning fluid tank are symmetrical and thus improve the aesthetics of a balance in terms of appearance.

Second, regardless of the filling levels, the overall weight of fuel and cleaning fluid is distributed symmetrically from the center of the agricultural tractor to the left and right without being concentrated on one side. Accordingly, the center of gravity of the agricultural tractor is stabilized correspondingly.

Third, the injection holes are formed in the fenders at an appropriate filling height by taking into consideration the heights of humans, thereby enhancing the convenience of a user.

BRIEF DESCRIPTION OF THE DRA WINGS

DETAILED DESCRIPTION

Preferred embodiments according to the present disclosure will be described with reference to the accompanying drawings. However, for the sake of brevity of description, descriptions of well-known configurations will be omitted or abridged as much as possible.

<Overview of Configuration of Agricultural Tractor>

Figure 1:
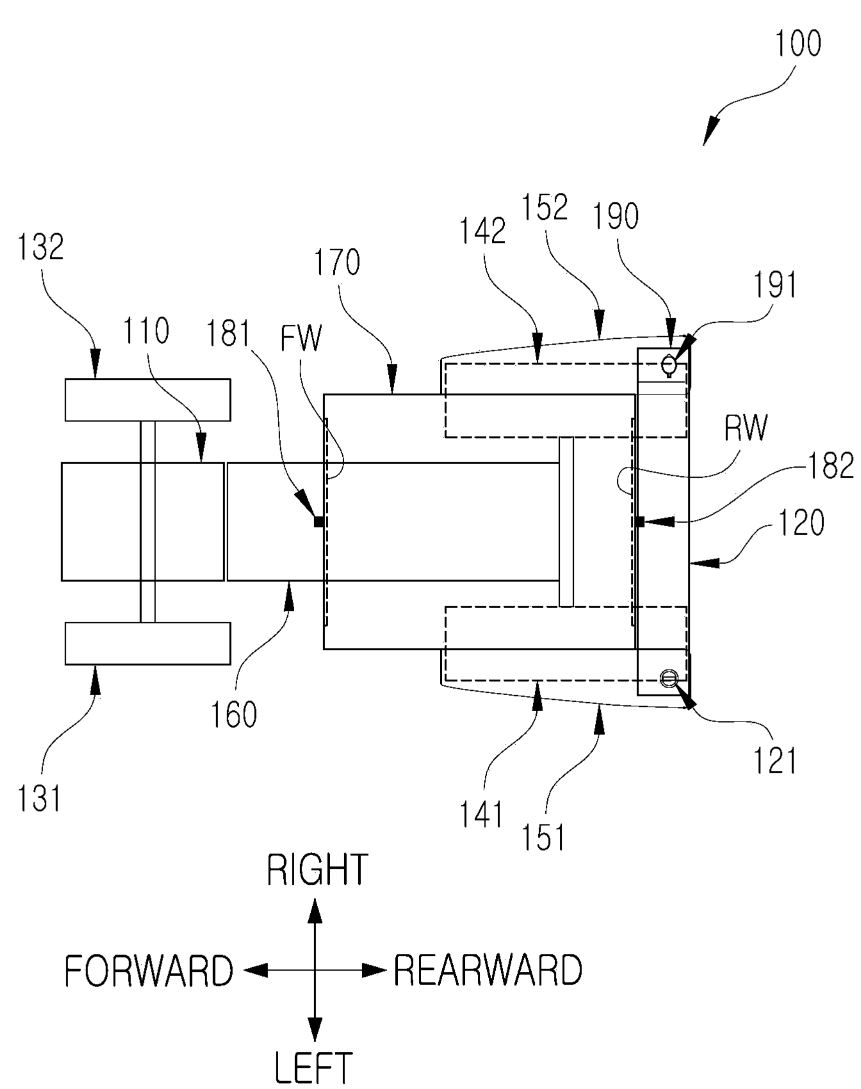
FIG. 1 is a conceptual plan view of the configuration of an agricultural tractor according to one embodiment of the present disclosure.
Figure 2:
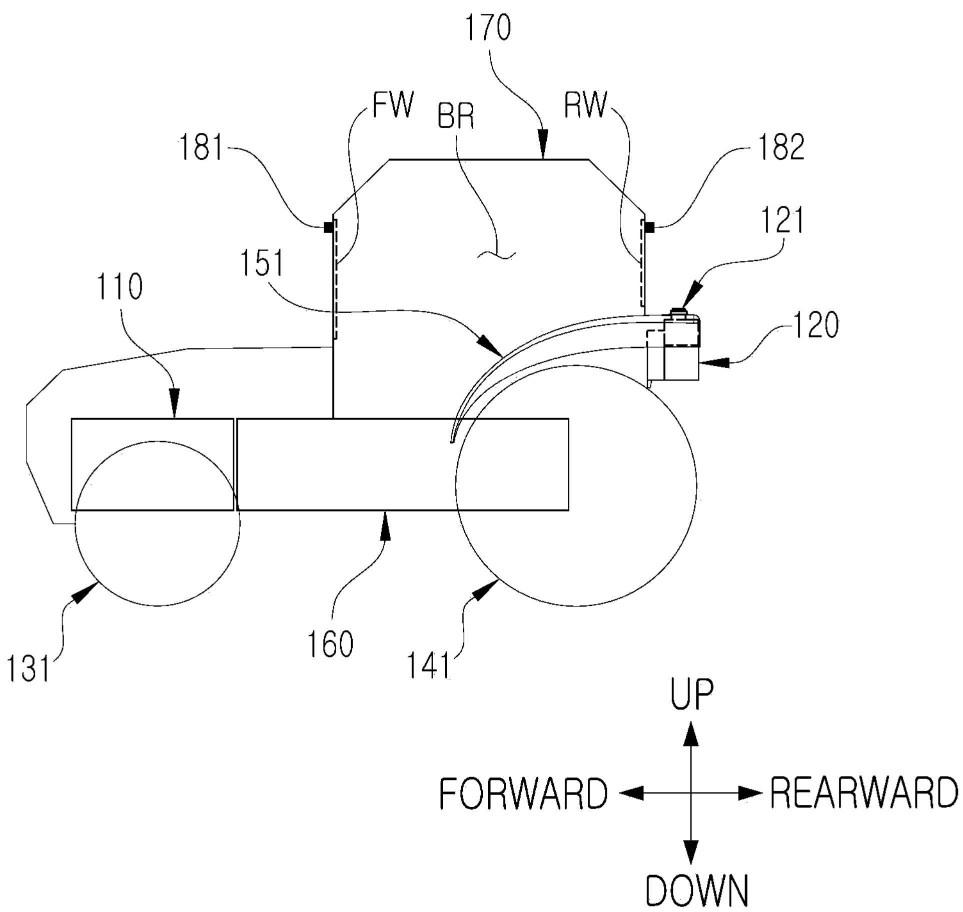
FIG. 2 is a conceptual side view of the configuration of the agricultural tractor of FIG. 1.

FIG. 1 is a conceptual plan view of the configuration of an agricultural tractor 100 according to one embodiment of the present disclosure, and FIG. 2 is a conceptual left side view of the agricultural tractor 100 of FIG. 1.

The agricultural tractor 100 according to the present embodiment includes an engine 110, a fuel tank 120, a first opening/closing cover 121, a first rear wheel 141, a second rear wheel 142, a first fender 151, a second fender 152, a transmission 160, a cabin 170, window brushes 181 and 182, a cleaning fluid tank 190, and a second opening/closing cover 191.

The engine 110 is driven by fuel stored in the fuel tank 120, and generates power used to rotate both rear wheels 141 and 142. It is obvious that the power of the engine 110 may be used to rotate both front wheels 131 and 132.

The fuel tank 120 stores fuel (e.g., diesel, gasoline, biofuel, etc.) required for the engine 110 to generate power.

Figure 3:
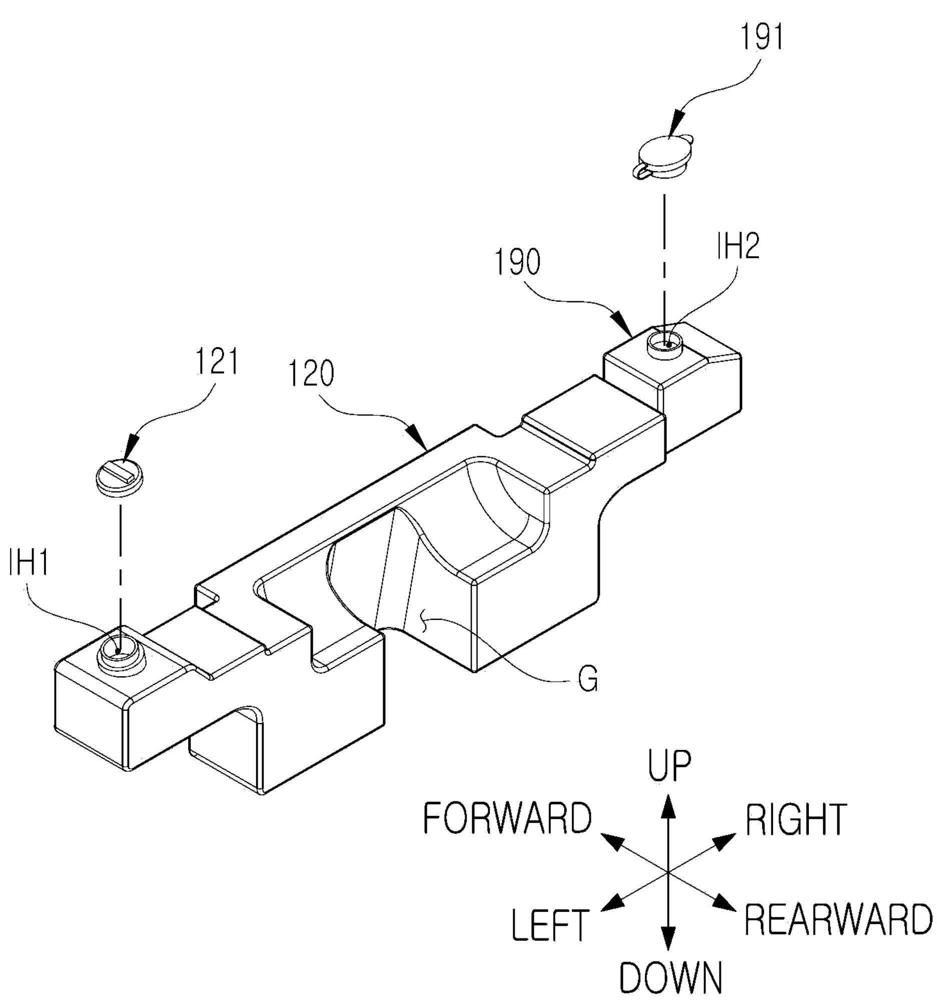
FIG. 3 is an excerpt perspective view of the fuel tank and cleaning fluid tank applied to the agricultural tractor of FIG. 1.

As shown in the excerpt view of FIG. 3, the fuel tank 120 has a first injection hole IH1 for injecting fuel.

According to the present embodiment, the fuel tank 120 is arranged at the rear of the cabin 170, and is preferably combined with the cabin 170.

The first opening/closing cover 121 is provided to selectively open and close the first injection hole IH1. The first opening/closing cover 121 is provided to be selectively attached to and detached from the fuel tank 120 by forward or backward rotation.

The first rear wheel 141 is positioned behind the first front wheel 131, and is rotated by the power of the engine 110.

The second rear wheel 142 is positioned behind the second front wheel 132 and to the right of the first rear wheel 141. That is, the first and second rear wheels 141 and 142 are spaced apart from each other in the left-right direction, and are arranged on the left and right sides, respectively.

In the description of the present embodiment, the names "first rear wheel 141" and "second rear wheel 142" referring to a left rear wheel and a right rear wheel, respectively, are arbitrarily assigned. Accordingly, it is also possible to name the right rear wheel as the "first rear wheel 141" and the left rear wheel as the "second rear wheel 142."

The first fender 151 is a mudguard positioned over the first rear wheel 141.

As shown in FIG. 2, the first fender 151 extends rearward along an upward curve near the front of the first rear wheel 141 when viewed from the side, and the rear end of the first fender 151 extends to have an approximately horizontal plane.

Figure 4:
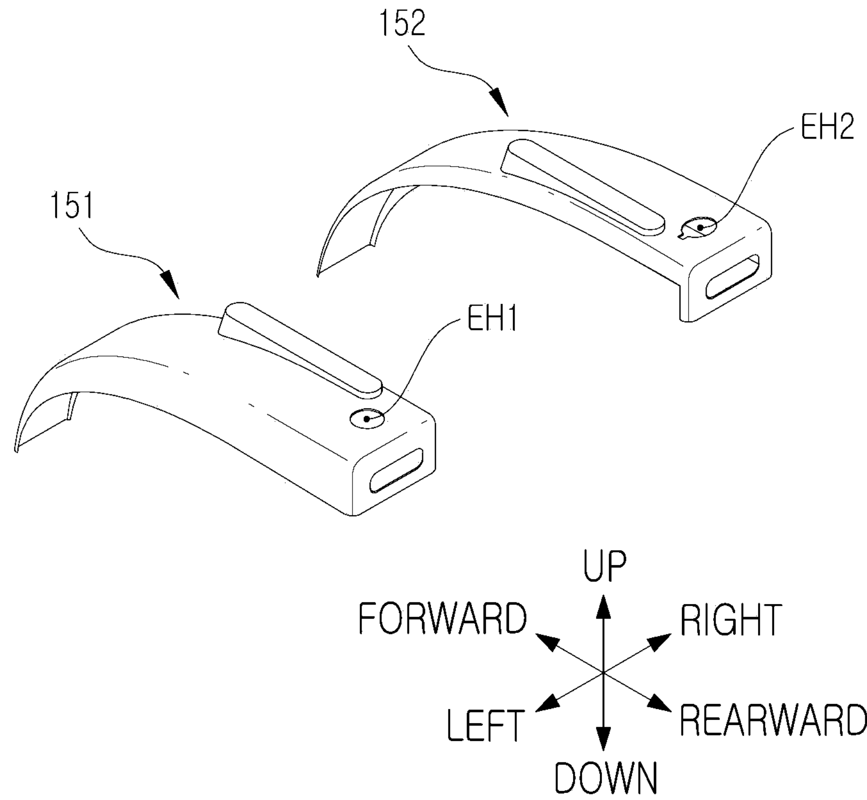
FIG. 4 is an excerpt perspective view of the first and second fenders applied to the agricultural tractor of FIG. 1.

As shown in the excerpt view of FIG. 4, the first fender 151 has a first exposure hole EH1 formed vertically at the rear end thereof.

The first exposure hole EH1 is intended to expose the first injection hole IH1 and the first opening/closing cover 121 upward.

Accordingly, the first exposure hole EH1 is formed at a location corresponding to the first injection hole IH1.

That is, an injector who wishes to inject fuel may open the first injection hole IH1 by reversely rotating the first opening/closing cover 121 exposed through the first exposure hole EH1 and removing the first opening/closing cover 121 from the fuel tank 120. After fuel has been injected into the fuel tank 120, the first injection hole IH1 is closed by attaching the first opening/closing cover 121 to the fuel tank 120.

The second fender 152 is a mudguard positioned over the second rear wheel 142.

The second fender 152 extends rearward along an upward curve in the front end of the second rear wheel 142, and the rear end of the second fender 152 extends to have an approximately horizontal plane, like the first fender 151. Furthermore, the second fender 152 is symmetrical in the left-right direction with the first fender 151.

As shown in FIG. 4, the second fender 152 has a second exposure hole EH2 formed vertically at the rear end thereof. This second exposure hole EH2 will be further described in a related portion later.

The transmission 160 shifts the power of the engine 110, and transmits the shifted power to the first and second rear wheels 141 and 142.

The transmission 160 may have various embodiments depending on the type of agricultural tractor 100, and may basically shift the forward and rearward directions of the agricultural tractor, the driving speed ratio, etc.

The cabin 170 forms a boarding room BR in which a driver boards. The cabin 170 shields the driver from an external environment, thereby contributing to the driver's ability to perform tasks in a comfortable indoor environment without being exposed to the external environment.

The cabin 170 has a front window FW and a rear window RW to ensure the driver's front and rear fields of view.

The window brushes 181 and 182 are provided to wipe the front and rear windows FW and RW. According to the present embodiment, the window brushes 181 and 182 are provided to wipe both the front and rear windows FW and RW. Obviously, it is also conceivable that a plurality of window brushes 181 and 182 are provided for each window FW or RW.

The cleaning fluid tank 190 stores cleaning fluid to be sprayed onto the window surfaces that are wiped by the window brushes 181 and 182.

As shown in FIG. 3, the cleaning fluid tank 190 has a second injection hole IH2 for injecting cleaning fluid.

The above-described second exposure hole EH2 is positioned at a location corresponding to the second injection hole IH2. That is, the second exposure hole EH2 is intended to expose the second injection hole IH2 and the second opening/closing cover 191, to be described below, upward.

An injector who wishes to inject cleaning fluid may open the second injection hole IH2 by opening the second opening/closing cover 191 exposed through the second exposure hole EH2. Then, after the cleaning fluid has been injected into the cleaning fluid tank 190, the second opening/closing cover 191 is closed to close the second injection hole IH2.

The second opening/closing cover 191 is provided to selectively open and close the second injection hole IH2.

The second opening/closing cover 191 is provided to selectively open and close the second injection hole IH2 in a hinged manner. By making the opening/closing method of the second injection hole IH2 by means of the second opening/closing cover 191 and the opening/closing method of the first injection hole IH1 by means of the first opening/closing cover 121 different from each other, the confusion between the fuel injection location and the cleaning fluid injection location may be intuitively prevented.

For reference, a sprayer (not shown) for spraying cleaning fluid contained in the cleaning fluid tank 190 onto the window surfaces is a well-known technical component that can be comprehensively incorporated into the configuration of each of the window brushes 181 and 182, and thus, a description thereof is omitted.

<Descriptions of Structure and Arrangement Locations>

The present disclosure has main features in the structure of the fuel tank 120 and the arrangement locations of the fuel tank 120 and the cleaning fluid tank 190. Accordingly, the structure of the fuel tank 120 and the arrangement locations of the fuel tank 120 and the cleaning fluid tank 190 will be sequentially described.

1. Structure of Fuel Tank

Figure 5:
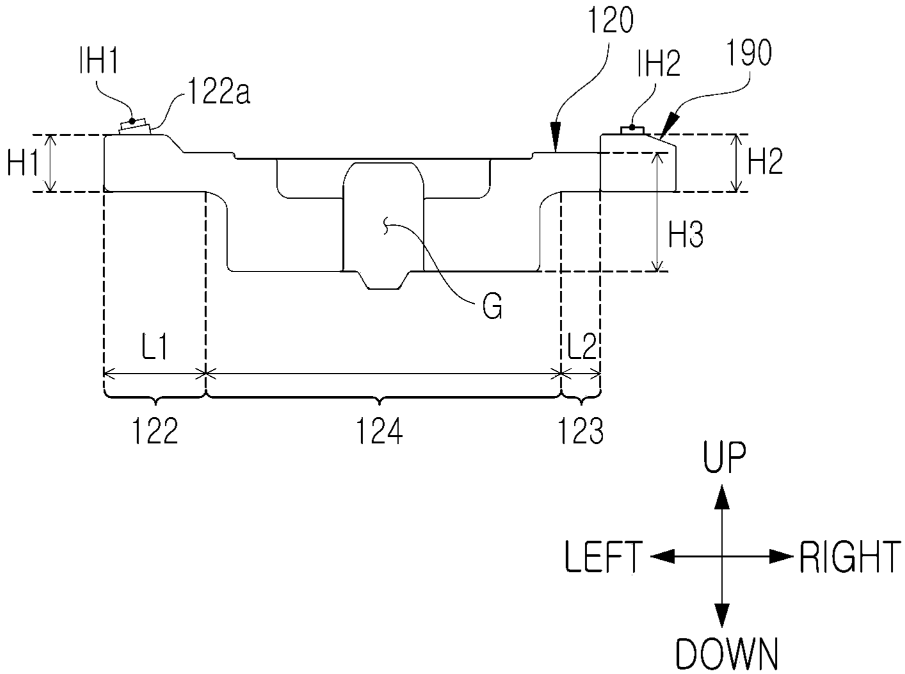
FIGS. 5 and 6 are rear views of the fuel tank and cleaning fluid tank of FIG. 3.

FIG. 5 is a rear view of the fuel tank 120 and the cleaning fluid tank 190.

The fuel tank 120 has a first wing portion 122, a second wing portion 123, and a body portion 124.

The first wing portion 122 forms the left portion of the fuel tank 120, which is one side of the fuel tank 120.

The first wing portion 122 is arranged approximately between the first rear wheel 141 and the first fender 151.

The first wing portion 122 may be coupled to the first fender 151, but needs to be appropriately spaced apart from the first rear wheel 141. Accordingly, the first wing portion 122 has a vertical width H1 narrower than the vertical width H3 of the body portion 124. However, fuel needs to be stored as close to the ground as possible in order to lower the center of gravity. Therefore, the fuel tank 120 is preferably designed such that the top of the first wing portion 122 is higher than the top of the body portion 124 that accommodates a larger amount of fuel. In other words, the bottom of the body portion 124, which accommodates a larger amount of fuel, is preferably lower than the bottom of the first wing portion 122, so that the fuel tank is designed such that the center of gravity of the fuel tank is as close to the ground as possible.

In addition, the first injection hole IH1 described above is formed in the first wing portion 122.

The first injection hole IH1 is formed in a protrusion **122*a* that protrudes upward through the first exposure hole EH1 of the first fender 151. The protrusion 122*a* is shaped to be slightly inclined to the left, thus facilitating fuel injection through the first injection hole IH1. That is, the protrusion 122***a* is shaped to be slightly inclined outward with respect to the cabin 170.

The second wing portion 123 forms the right portion of the fuel tank 120, which is the remaining side of the fuel tank 120.

The second wing portion 123 is arranged between the second rear wheel 142 and the second fender 152.

The second wing portion 123 may be coupled to the second fender 152, but needs to be appropriately spaced apart from the second rear wheel 142. Accordingly, the second wing portion 123 has a vertical width H2 narrower than the vertical width H3 of the body portion 124. For symmetry and balance, it may be preferable that the vertical width H1 of the first wing portion 122 and the vertical width H2 of the second wing portion 123 be the same as each other.

According to the present embodiment, the length L2 of the second wing portion 123 in the left-right direction is shorter than the length L1 of the first wing portion 122 in the left-right direction. The reason for this is that the arrangement location of the cleaning fluid tank 190 having the second injection hole IH2 to be described later is taken into consideration.

Meanwhile, the body portion 124 occupies the space between the first wing portion 122 and the second wing portion 123.

The body portion 124 is formed to extend toward the center along the line in the left-right direction from the first and second wing portions 122 and 123, and has a geometric structure that extends downward to be further enlarged and thus allow for larger fuel storage. Accordingly, the body portion 124 is formed to have a vertical width H3 larger than the vertical width H1 of the first wing portion 122 or the vertical width H2 of the second wing portion 123. Furthermore, the body portion 124 is positioned to be lower overall than the first and second wing portions 122 and 123, thus contributing to maintaining the stable center of gravity of the agricultural tractor 100.

The body portion 124 has a preventive recess G to prevent interference with an upper link (not shown). In this case, the upper link is intended to connect an auxiliary implement to the agricultural tractor 100.

For reference, the first injection hole IH1 is positioned to be higher than the top of the second wing portion 123 due to the protrusion 122*a*, so that fuel can be fully filled into the internal space of the second wing portion 123.

2. Arrangement Locations of Fuel Tank and Cleaning Fluid Tank

The fuel tank 120 and the cleaning fluid tank 190 are arranged behind the cabin 170.

Figure 6:
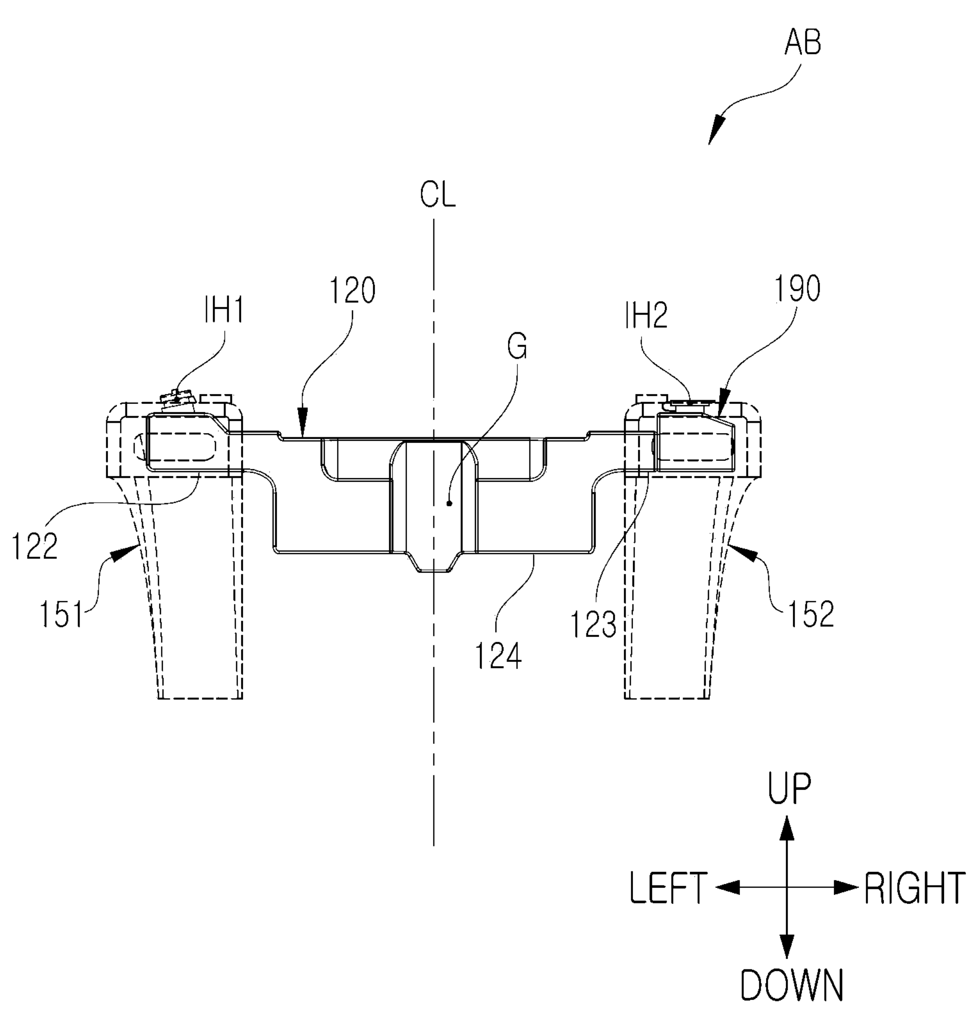

FIG. 6 shows the arrangement of the first fender 151, the second fender 152, the fuel tank 120, and the cleaning fluid tank 190 when viewed forward from the rear.

The first wing portion 122 of the fuel tank 120 hangs over the first fender 151, and the second wing portion 123 thereof hangs over the second fender 152.

Furthermore, the cleaning fluid tank 190 is arranged adjacent to the second wing portion 123. Obviously, it is preferable that the cleaning fluid tank 190 be fixedly coupled to the right side surface of the second wing portion 123.

Accordingly, a combined body AB in which the fuel tank 120 and the cleaning fluid tank 190 are coupled to each other has a roughly symmetrical shape with respect to a center line CL, which vertically divides the center of the agricultural tractor 100.

In particular, the first injection hole IH1 and the second injection hole IH2 are formed at symmetrical locations on both the left and right sides with respect to the center line CL. In other words, this means that the first exposure hole EH1 and the second exposure hole EH2 are formed at symmetrical locations on both the left and right sides with respect to the center line CL. Accordingly, according to the present embodiment, the distance between the center of the first exposure hole EH1 and the center line CL is equal to the distance between the second exposure hole EH2 and the center line CL.

Figure 7:
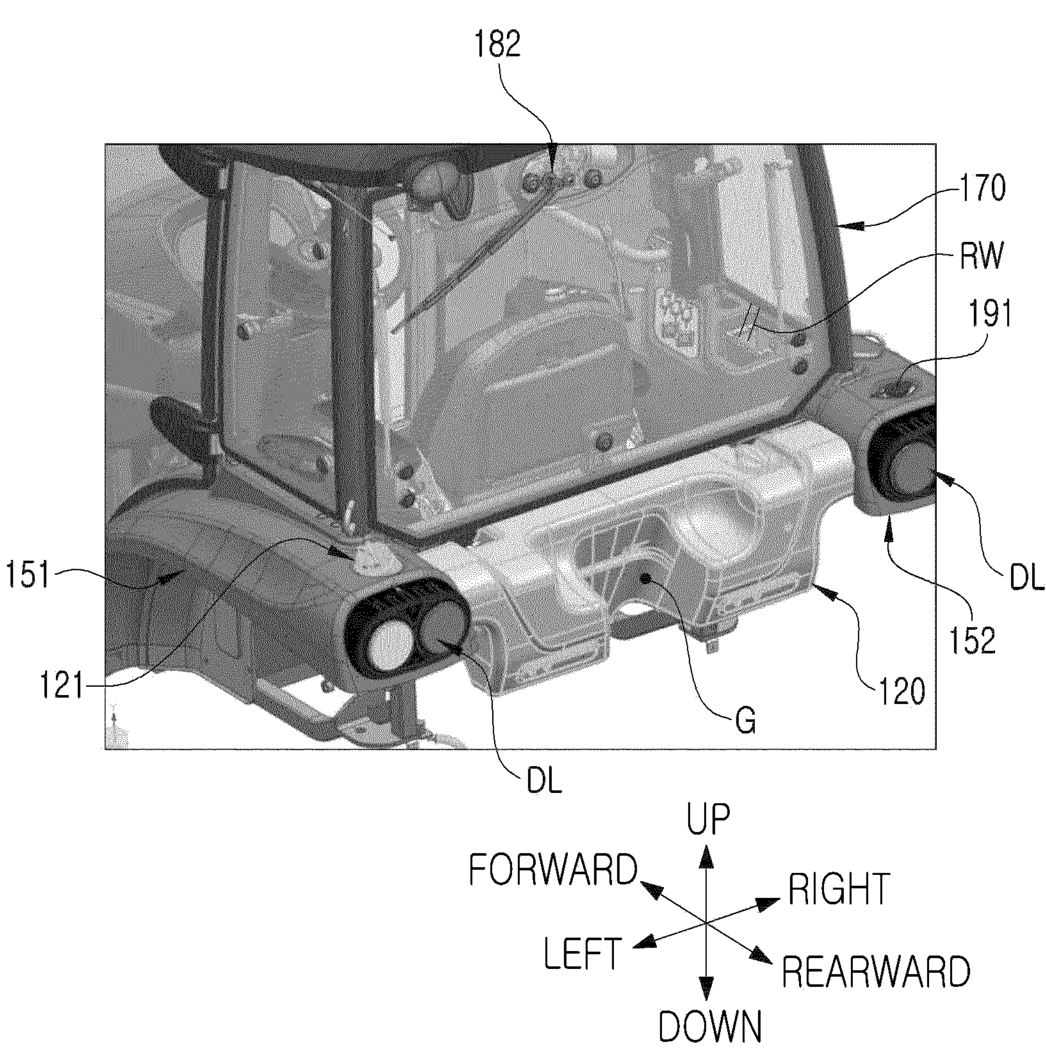
FIG. 7 is a reference view showing the appearance of an agricultural tractor to which the fuel tank and cleaning fluid tank of FIG. 3 are applied.

Meanwhile, as shown in FIG. 7, turn signals DL are provided to be symmetrically arranged at the rear of the first wing portion 122 of the fuel tank 120 and the rear of the cleaning fluid tank 190. Accordingly, at least in appearance, the rear of the agricultural tractor 100 has the aesthetics of a balance that is almost symmetrical on the left and right sides with respect to the center line CL. However, the only minor difference is the difference between the shape of the first opening/closing cover 121 and the shape of the second opening/closing cover 191.

Furthermore, the fuel tank 120 is structured to accommodate approximately equal amounts of fuel on the left and right sides with respect to the center line CL. However, the discrepancy in the amount of fuel between the left and right sides attributable to the fact that the left-right length of the second wing portion 123 is shorter than the left-right length of the first wing portion 122 and the resulting shift in the center of gravity of the fuel tank 120 itself are compensated for by the cleaning fluid tank 190 positioned on the right side of the second wing portion 123. Ultimately, the center of gravity of the combined body AB of the fuel tank 120 and the cleaning fluid tank 190 is approximately aligned with the center line CL.

For reference, FIG. 7 shows in more detail the actual shapes of the first fender 151, the second fender 152, the window brush 182, the rear window RW, the cabin 170, etc.

3. Modification

Figure 8:
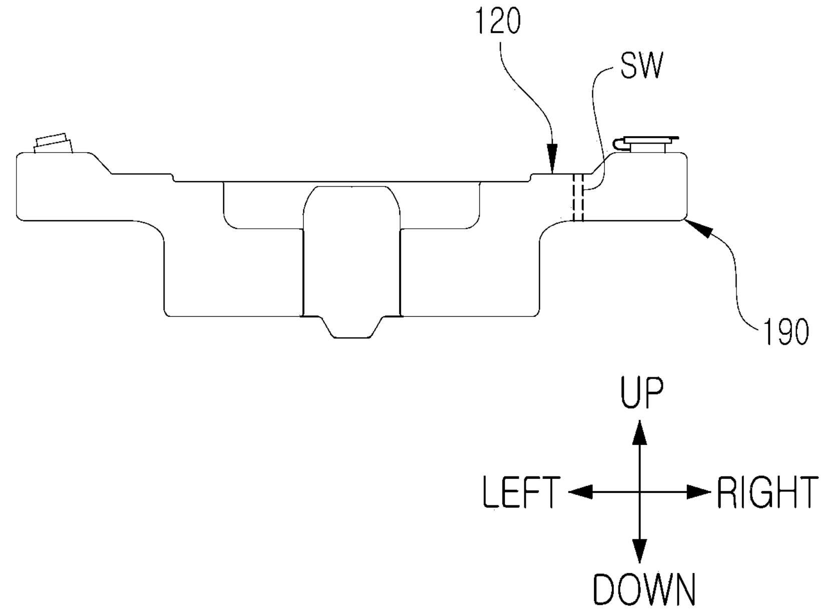
FIG. 8 is a reference view showing a modification of the fuel tank and cleaning fluid tank of FIG. 3.

A. FIG. 8 shows an example in which the fuel tank 120 and the cleaning fluid tank 190 are formed and manufactured in an integrated shape. However, the fuel tank 120 and the cleaning fluid tank 190 are separated from each other by a partition wall SW.

According to the present modification, the fuel tank 120 and the cleaning fluid tank 190 are integrated into a single body, thus allowing for a more sophisticated bilaterally symmetrical structure. Furthermore, the fuel tank 120 and the cleaning fluid tank 190 are manufactured in an integrated tank shape, and thus material costs and assembly man-hours are reduced.

B. In the case of a relatively small agricultural tractor 100, a cabin 170 may not be provided. In this case, there is no need to provide a cleaning fluid tank 190. Accordingly, an implementation may be made such that in FIG. 8, the partition wall SW can be removed and the overall internal space can be utilized as a fuel storage space. Even according to the present modification, the symmetrical structure and arrangement structure of the fuel tank 120 ensure that the aesthetics of the design balance of the agricultural tractor 100 is pursued. Furthermore, the center of gravity of the fuel tank 120 may be positioned along the center line CL, so that there is no concern about weight bias due to fuel.

C. The left-right arrangement of the fuel tank 120 and the cleaning fluid tank 190 may be exactly reversed with respect to the center line CL depending on the implementation. That is, it is also entirely possible to consider a structure in which the cleaning fluid tank 190 is provided on the first fender 151 side and the first injection hole IH1 is arranged on the second fender 152 side.

<References>

1. In the above embodiments, the first and second opening/closing covers 121 and 191 and the first and second exposure holes EH1 and EH2 are implemented to be symmetrical to each other by taking into consideration the symmetry of the two fenders 151 and 152. However, it can be seen that, even when exact symmetry is not achieved but the first and second opening/closing covers 121 and 191 and the first and second exposure holes EH1 and EH2 are positioned at corresponding locations in the left-right directions, the intuitive recognition of the locations, intuitive operation, easy assembly, and balanced arrangement may be sufficiently maintained.

2. Furthermore, the above embodiments describe the remaining features while taking into consideration both fenders 151 and 152. However, depending on the implementation, even when both fenders 151 and 152 are excluded, the remaining features, excluding the systematic relationship between the two fenders 151 and 152 and the remaining features, may still be sufficiently designed.

The above-described embodiments merely describe preferred examples of the present disclosure, and may have various applications. Therefore, the present disclosure should not be construed as being limited to the content described above. Instead, the scope of the present disclosure should be construed based on the separately described claims and their equivalents.

The invention claimed is:

1. An agricultural tractor comprising:

an engine configured to generate power, a first rear wheel configured to be rotated by the power of the engine;

a second rear wheel spaced apart from the first rear wheel in a left-right direction, and configured to be rotated by the power of the engine;

a first fender configured to surround a portion above the first rear wheel;

a second fender configured to surround a portion above the second rear wheel;

a fuel tank configured to store fuel required for the engine to generate the power, and provided with a first injection hole for injecting the fuel to be stored, the fuel tank comprising:

a first wing portion forming a first side of the fuel tank and arranged between the first rear wheel and the first fender;

a second wing portion forming a remaining side of the fuel tank and arranged between the second rear wheel and the second fender; and a body portion occupying a space between the first wing portion and the second wing portion, wherein:

the first wing portion has a first vertical height in a vertical direction equal to a second vertical height of the second wing portion, the first wing portion has a first length in the left-right direction longer than a second length of the second wing portion, and the body portion has a third vertical height greater than the first vertical height and a bottom of the body portion is disposed lower in the vertical direction than respective bottoms of the first wing portion and the second wing portion;

a first opening/closing cover configured to selectively open and close the first injection hole;

a transmission configured to shift the power of the engine and transmit the shifted power to the first and second rear wheels;

a cabin provided above the transmission, and configured to form a boarding room in which a driver boards;

a window brush configured to wipe a window of the cabin;

a cleaning fluid tank configured to store cleaning fluid that can be sprayed onto a window surface of the window to be wiped by the window brush, and provided with a second injection hole for injecting the cleaning fluid to be stored; and a second opening/closing cover configured to selectively open and close the second injection hole;

wherein the first fender has a first exposure hole capable of exposing the first opening/closing cover at a location corresponding to the first injection hole.

2. The agricultural tractor of claim 1, wherein the second fender has a second exposure hole capable of exposing the second opening/closing cover at a location corresponding to the second injection hole.

3. The agricultural tractor of claim 2, wherein the first and second exposure holes are formed at corresponding locations on left and right sides.

4. The agricultural tractor of claim 2, wherein:

the fuel tank is positioned in an area behind the cabin, and the one side of the fuel tank hangs over the first fender and the remaining side of the fuel tank hangs over the second fender when viewed forward from a rear; and the cleaning fluid tank is arranged adjacent to the remaining side of the fuel tank.

5. The agricultural tractor of claim 4, wherein turn signals are arranged at a rear of the first side of the fuel tank and a rear of the cleaning fluid tank, respectively.

6. The agricultural tractor of claim 4, wherein the fuel tank and the cleaning fluid tank are provided in an integrated form, and are separated from each other by a partition wall.

7. The agricultural tractor of claim 1, wherein the fuel tank is positioned in an area behind the cabin, and the one side of the fuel tank hangs over the first fender and the remaining side of the fuel tank hangs over the second fender when viewed forward from a rear.

8. An agricultural tractor comprising:

an engine configured to generate power;

a first rear wheel configured to be rotated by the power of the engine;

a second rear wheel spaced apart from the first rear wheel in a left-right direction, and configured to be rotated by the power of the engine;

a first fender configured to surround a portion above the first rear wheel;

a second fender configured to surround a portion above the second rear wheel;

a fuel tank configured to store fuel required for the engine to generate the power, and provided with a first injection hole for injecting the fuel to be stored, the fuel tank comprising:

a first wing portion forming a first side of the fuel tank and arranged between the first rear wheel and the first fender;

a second wing portion forming a remaining side of the fuel tank and arranged between the second rear wheel and the second fender; and a body portion occupying a space between the first wing portion and the second wing portion, wherein:

the first wing portion has a first vertical height in a vertical direction equal to a second vertical height of the second wing portion,
the first wing portion has a first length in the left-right direction longer than a second length of the second wing portion, and
the body portion has a third vertical height greater than the first vertical height and a bottom of the body portion is disposed lower in the vertical direction than respective bottoms of the first wing portion and the second wing portion;
a first opening/closing cover configured to selectively open and close the first injection hole;
a transmission configured to shift the power of the engine and transmit the shifted power to the first and second rear wheels;
a cabin provided above the transmission, and configured to form a boarding room in which a driver boards;
a window brush configured to wipe a window of the cabin;
a cleaning fluid tank configured to store cleaning fluid that can be sprayed onto a window surface of the window to be wiped by the window brush, and provided with a second injection hole for injecting the cleaning fluid to be stored; and
a second opening/closing cover configured to selectively open and close the second injection hole;
wherein the first and second opening/closing covers are arranged at corresponding locations on left and right sides.

9. The agricultural tractor of claim 8, wherein:
the fuel tank is arranged in an area behind the cabin; and
the cleaning fluid tank is arranged adjacent to the remaining side of the fuel tank.

10. The agricultural tractor of claim 9, wherein turn signals are arranged at a rear of the one side of the fuel tank and a rear of the cleaning fluid tank, respectively.

11. The agricultural tractor of claim 9, wherein the fuel tank and the cleaning fluid tank are provided in an integrated form, and are separated from each other by a partition wall.

12. An agricultural tractor comprising:
an engine configured to generate power;
a first rear wheel configured to be rotated by the power of the engine;
a second rear wheel spaced apart from the first rear wheel in a horizontal direction, and configured to be rotated by the power of the engine;
a first fender configured to surround a portion above the first rear wheel;
a second fender configured to surround a portion above the second rear wheel;
a fuel tank configured to store fuel required for the engine to generate the power, and provided with a first injection hole for injecting the fuel to be stored, the fuel tank comprising:
a first wing portion forming one side of the fuel tank and arranged between the first rear wheel and the first fender;
a second wing portion forming a remaining side of the fuel tank and arranged between the second rear wheel and the second fender; and
a body portion occupying a space between the first wing portion and the second wing portion,
wherein:
the first wing portion has a first vertical height in a vertical direction equal to a second vertical height of the second wing portion,
the first wing portion has a first length in the horizontal direction longer than a second length of the second wing portion, and
the body portion has a third vertical height greater than the first vertical height and a bottom of the body portion is disposed lower in the vertical direction than respective bottoms of the first wing portion and the second wing portion;
a first opening/closing cover configured to selectively open and close the first injection hole;
a transmission configured to shift the power of the engine and transmit the shifted power to the first and second rear wheels;
a cabin provided above the transmission, configured to form a boarding room in which a driver boards and comprising a window;
a cleaning fluid tank configured to store cleaning fluid that can be sprayed onto the window, and provided with a second injection hole for injecting the cleaning fluid to be stored; and
a second opening/closing cover configured to selectively open and close the second injection hole;
wherein the first fender has a first exposure hole capable of exposing the first opening/closing cover at a location corresponding to the first injection hole.

13. The agricultural tractor of claim 12, further comprising:
a window brush configured to wipe a window surface of the window.

* * * * *